A. B. LANDIS.
CUTTER HEAD.
APPLICATION FILED AUG. 26, 1909.
1,017,882.
Patented Feb. 20, 1912.
2 SHEETS—SHEET 1.
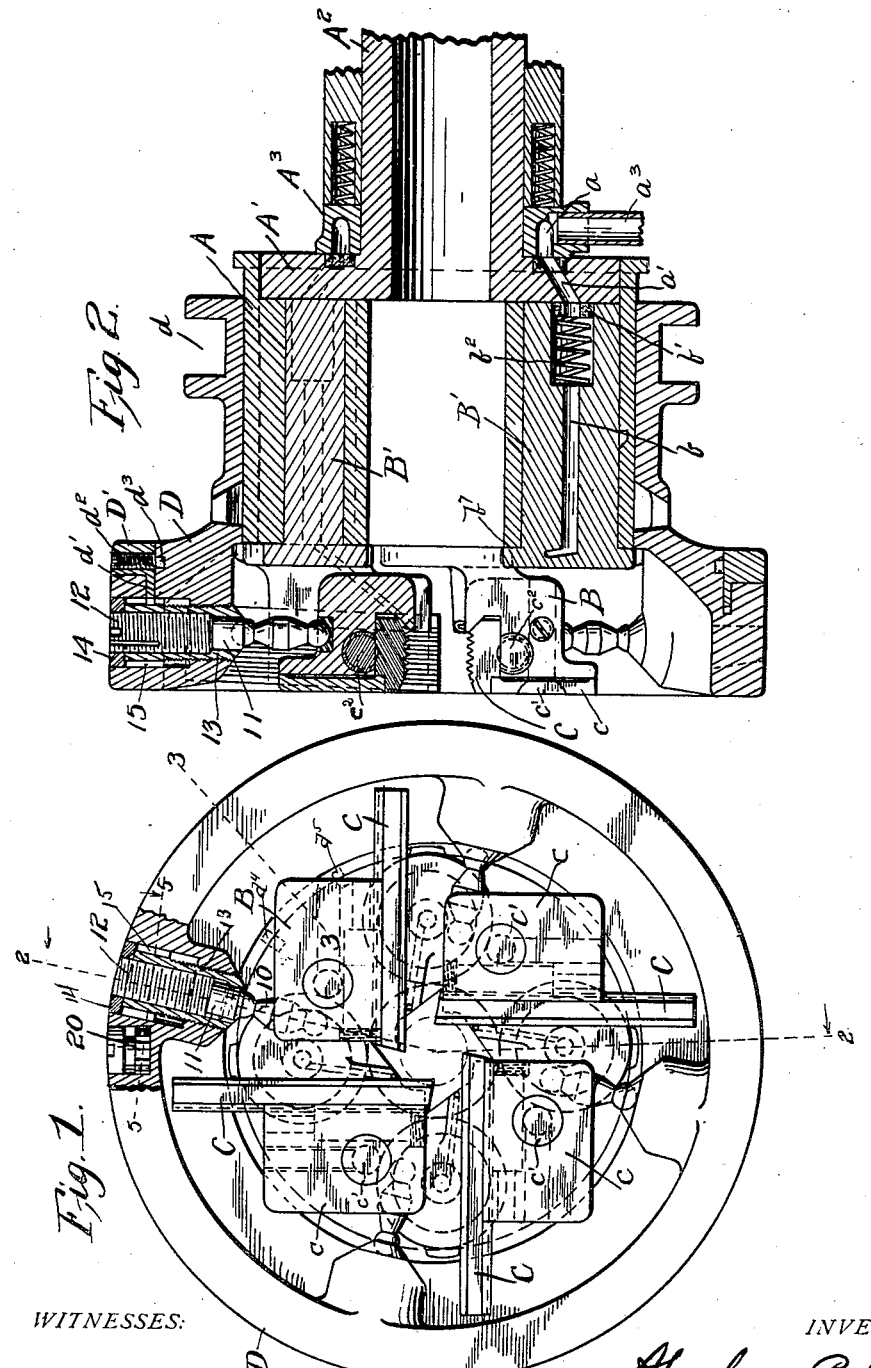

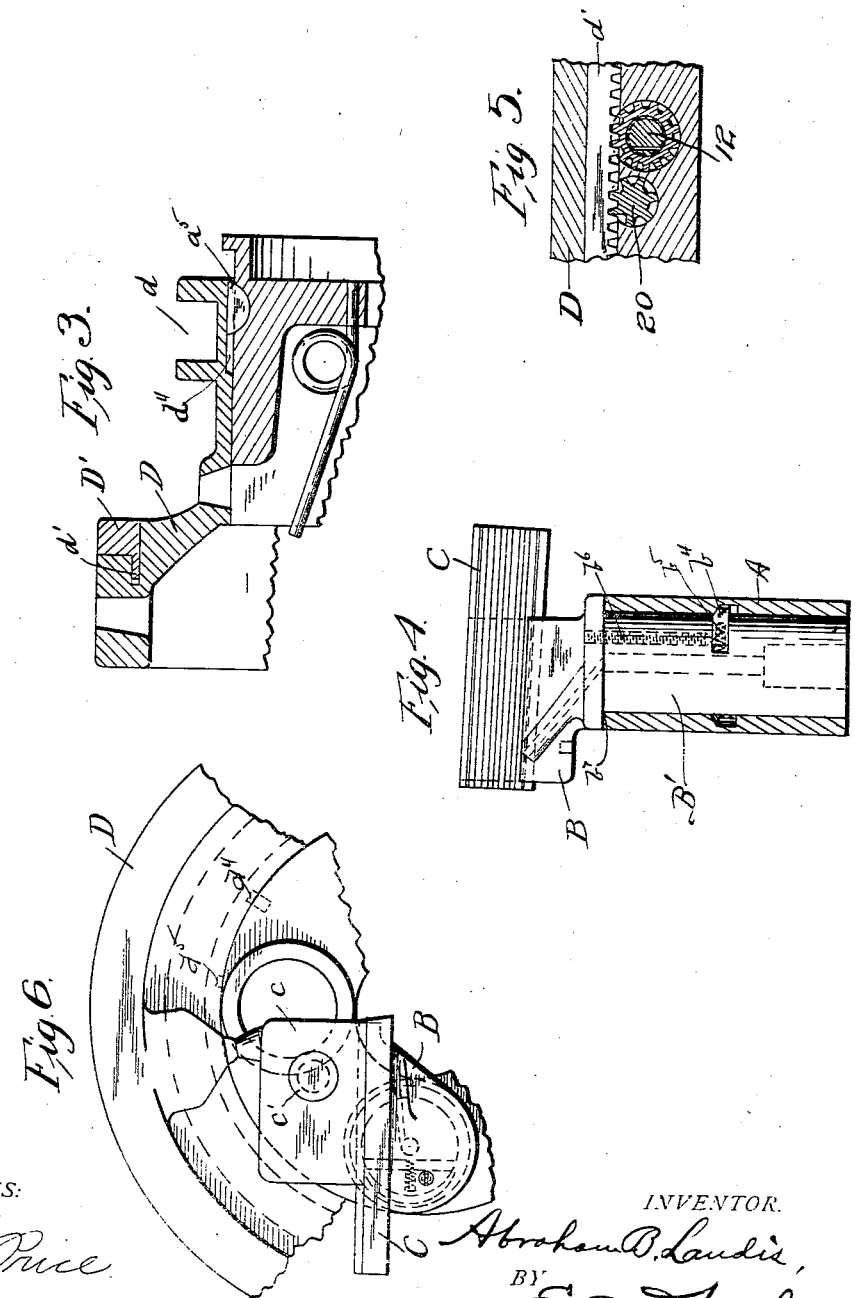

UNITED STATES PATENT OFFICE.

ABRAHAM B. LANDIS, OF WAYNESBORO, PENNSYLVANIA.

CUTTER-HEAD.

1,017,882.  Specification of Letters Patent.  Patented Feb. 20, 1912.

Application filed August 26, 1909. Serial No. 514,793.

*To all whom it may concern:*

Be it known that I, ABRAHAM B. LANDIS, a citizen of the United States, residing at Waynesboro, in the county of Franklin and State of Pennsylvania, have invented certain new and useful Improvements in Cutter-Heads, of which the following is a specification.

My said invention consists in various improvements in the details of construction and arrangement of parts of cutter-heads for cutting screw-threads on bolts, etc., whereby a structure is provided which is very rigid in its support of the cutters forming the die and also wherein a constant flow of oil onto the work is provided through the cutter-holders, and other advantages secured, all as will be hereinafter more fully described and claimed.

Referring to the accompanying drawings which are made a part hereof and on which similar reference characters indicate similar parts, Figure 1 is a front elevation, or face view, of a cutter-head comprising my said invention a portion of the rim on one side of said head being broken away to illustrate the interior construction more clearly, Fig. 2 a longitudinal section looking in the direction indicated by the arrows from the dotted line 2—2 in Fig. 1, Fig. 3 a detail section on the dotted line 3—3 in Fig. 1, Fig. 4 a detail view of one of the cutter-holders separately, Fig. 5 a detail section on the dotted line 5—5 in Fig. 1, and Fig. 6 a detail front elevation showing a left-hand cutter-holder in position.

In said drawings the portions marked A represent the body of the head, B the cutter-holders, C the chaser, or cutters, and D a sliding ring mounted on the casing A and carrying the seats for the supporting and adjusting devices for the cutter-holders.

The body A is a casting of suitable form and dimensions for the purpose, adapted to be mounted upon a head or disk A' on the outer end of the machine spindle A². Said body is formed with a central opening and has longitudinal perforations arranged equidistant around said opening to receive the trunnions of the cutter-holders and serve as bearings therefor.

The cutter-holders B are suitably shaped blocks formed with recesses on their faces to receive the chasers and each is mounted on one side of a cylindrical trunnion B' of a size and form to fit into one of the perforations provided therefor in the body A. The body of each holder B extends to one side of the axis of its trunnion and is mounted to carry the chaser tangential to the work. The chasers C are each secured to the cutter-holders B by a clamping plate $c$ and a clamping screw $c'$ extending through said clamping plate into the body of said holder B, the inner edge of said clamping plate engaging with a recess in the outer corner of the chaser adjacent to its seat upon said holder. The inner edge of said chaser is formed with a tapered outer corner adapted to fit under an overhanging tapered flange on said holder. The longitudinal adjustment of said chaser is effected by means of a screw $c^2$ mounted in a longitudinal recess in the holder B with its outer face extending through the face of said holder and engaging with screw-threads in the back of said chaser. This construction and arrangement of the cutter-holder and chaser is, as will be seen, the same as more fully shown and described in my application No. 458,381, filed October 19, 1908. Each of the said trunnions B' of said holders is formed with a longitudinal central perforation $b$ which, at the outer ends, adjacent to the cutter-holders, terminate in a branch running at an angle toward the center of the head and out through the inner side of the cutter-holder, being arranged to discharge onto the face of the chaser adjacent to the work. The inner ends of said perforations $b$ are enlarged and have a packing ring $b'$ therein between which and the inner end of the enlarged section is mounted a coiled spring $b^2$ arranged to force said packing ring tightly against the face of the head A', against which the inner end of said trunnion abuts. An oil ring A³ is mounted on the machine spindle A² adjacent to said head A' and has a circular recess $a$ therein which communicates through perforations $a'$, in the head A' and the perforations in the packing rings $b'$ with the perforations $b$. An oil supply tube $a^2$ is connected with said ring A³ communicating with said recess $a$ to furnish a supply of oil, which flows through said circular recess $a$ around said ring and through the several perforations $a'$ into the longitudinal perforations $b$ in the several trunnions B' and out through the diagonally extending branches thereof onto the face of the chasers, thus keeping a constant flow of oil upon the work.

In the inner corner of the outside edge of each holder B is formed a recess and seat to receive one end of a toggle lever 10. The outer end of said toggle lever is mounted in an adjustable seat 11 in the inner end of a radial perforation extending through ring D. A pin 12 screw-threaded in a sleeve 13 is mounted in said radial perforation. Said sleeve 13 is exteriorly screw-threaded and engages with a screw-thread in the inner end of said radial perforation. The outer end of the socket is enlarged to accommodate a pinion 15 formed on the outer end of sleeve 13 and a nut 14 is mounted on the outer end of pin 12 adjacent to the outer end of sleeve 13 to fill the outer end of said socket.

The ring D is formed on a sleeve mounted to slide longitudinally upon the body A having a circumferential groove $d$ in which a shifting fork (not shown) may engage for operating it longitudinally of said body. In the outer rear edge of said ring D is formed a recess and in said recess is mounted a ring D' having horizontal flanges $d'$ on its inner edge extending through slots in the adjacent part of ring D and formed with teeth on their inner edges to engage with the teeth of the pinions 15. Said ring D' is secured in position by screws $d^2$ which have short cylindrical points adapted to engage with a circumferential groove $d^3$ in the outer face of said ring D'. A pinion 20 is mounted in a radial socket in the rim of ring D the teeth of which engage with the teeth of one of the flanges $d'$ of the ring D'. In the outer end of said pinion is formed a slot for engagement with a screw-driver, by which said pinion may be turned, and, through its connection with the ring D', turn all of the pinions 15, so as to adjust the relative radial position of the seats 11 for the outer ends of the toggle levers 10. By this arrangement the support for the cutter-holders is arranged to bear at a point to one side of the axis on which said cutter-holder is supported at the extreme outer end of said cutter-holder so that its support will be rigid and directly in line with the axis of the work, thus providing a die that will not yield under the strain of the work while supporting the chasers in a position tangential with the work.

The ring D is secured from circumferential movement on the body A by means of a key $a^5$ set into the body to project therefrom and adapted to engage with a key-way formed in said ring. In the position shown in Fig. 1 said key engages with a key-way $d^4$. When it is desired to change the cutter-head from a right-hand cutter, as shown in Fig. 1, to a left-hand cutter, as shown in Fig. 6, it will be necessary to rotate ring D to bring the seats for the outer ends of the toggle-pins 10 in line with the outer ends of the left-hand cutter-holders. To accomplish this the right-hand cutter-holders B are first removed from the head A, the ring D is slid forward on the body far enough to pass off the key $d^4$ when said ring may be turned to bring the key-way $d^5$ in line with said key $a^5$ in which position it may be slid back onto said body and thus secured in position to bring the supports for the outer ends of the toggle-pins in proper position for the left-hand die.

The cutter-holders are secured in position by means of spring mounted keepers $b^4$ mounted in sockets in the trunnions of said cutter-holders on coiled springs $b^5$ and adapted to engage a circumferential groove in the interior of each of the bearings in the body A. Said groove and keeper being tapered on the side adjacent to the cutter-holder, the spring behind said keeper will act to draw the trunnion back into its bearing and hold the holder against a shoulder $b^7$ adapted to bear upon the outer end or face of the body surrounding said bearing. A screw $b^6$ with a conical end is mounted in a longitudinal perforation in the trunnion and adapted to engage by its pointed inner end with a counter-sunk recess in the side of the keeper, by means of which the same may be withdrawn from the groove by forcing the screw inward, thus releasing the engagement and permitting the cutter-holder to be withdrawn.

Having thus fully described my said invention, what I claim as new and desire to secure by Letters Patent, is:

1. In a cutter-head, the combination of the body, a series of cutter-holders mounted on trunnions in perforations around the axis of said body, a sliding ring on said body, and toggle-pins each mounted with one end in a seat at the inner end of a cutter-holder opposite the cutting point and the other end in a seat carried by said sliding ring, substantially as set forth.

2. In a cutter-head, the combination of the body, a series of cutter-holders mounted to rock on trunnions in bearings formed in said body around its axis, a sliding ring mounted on said body, radial seats adjustably mounted in said ring surrounding said cutter-holders each of said cutter-holders being formed with a seat in its outside substantially in line with said adjustable seats and the axis of the head, and a toggle-pin mounted at one end in a seat in a cutter-holder and at its other end in a seat in said sliding ring, substantially as set forth.

3. In a cutter-head, the combination of the body, cutter-holders provided with rocking trunnions mounted in bearings around the axis of said body each of said trunnions and the holder thereon being formed with a longitudinal perforation extending from the inner end of the trunnion out through the cutter-holder with its discharge point adjacent to the work, an oil supply pipe communicating with a circumferential recess in the supporting part adjacent to the inner ends of said trunnions, and means for supporting and adjusting said cutter-holders to open and close the die, substantially as set forth.

4. A cutter-head comprising a body, cutter-holders with their trunnions mounted in longitudinal perforations in said body around its axis and formed with perforations extending longitudinally through said trunnions from their ends and at an angle through the cutter-holders to bring their point of discharge adjacent to the work, and a stationary part mounted on the spindle connected with an oil supply and formed with a circumferential recess and arranged to communicate through perforations with the inner ends of the perforations in the trunnions of said cutter-holder, substantially as set forth.

5. A cutter-head comprising a body, a ring mounted thereon by which the die is opened and closed, cutter-holders and cutters composing the die, supports for said cutter-holders interposed between seats carried by said ring and seats in said cutter-holders, said ring being secured on the body by a sliding connection with different circumferential engaging points, substantially as set forth.

6. A cutter-head comprising a body, movable cutter-holders, a sliding ring by which the die is opened and closed supports for said cutter-nolders interposed between said ring and cutter-holders, said ring being formed with a multiplicity of engaging points circumferentially spaced, and a part on said body adapted to engage with either of said points as said ring is turned to register therewith, substantially as set forth.

In witness whereof, I have hereunto set my hand and seal at Waynesboro, Pennsylvania this 25th day of August, A. D. nineteen hundred and nine.

ABRAHAM B. LANDIS. [L. S.]

Witnesses:
 T. S. CUNNINGHAM,
 S. G. CUNNINGHAM.